June 10, 1958     V. H. CHATTEN     2,837,869
PLANT-WATERING DEVICE
Filed Nov. 12, 1954
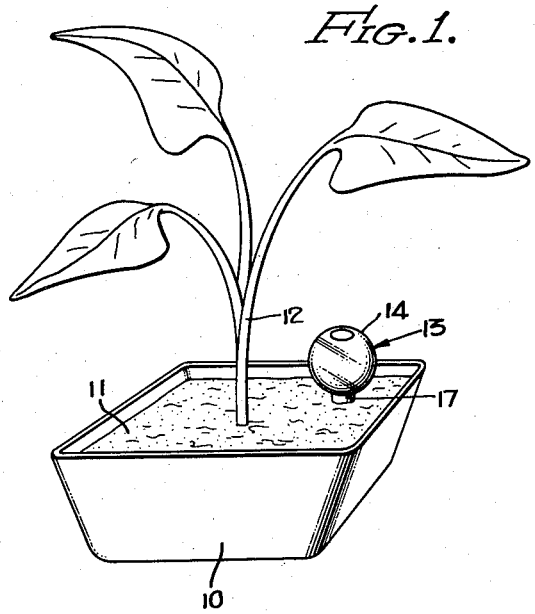
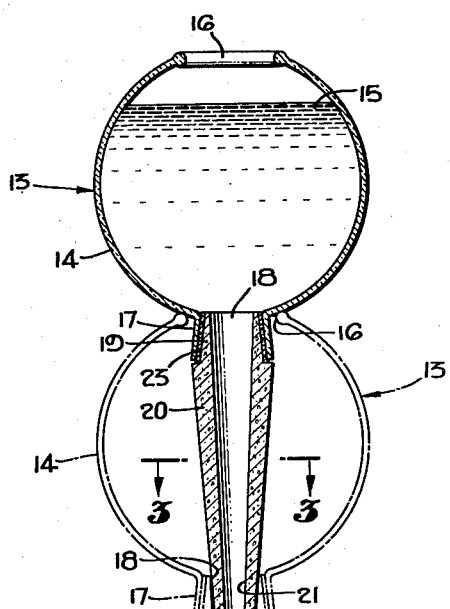
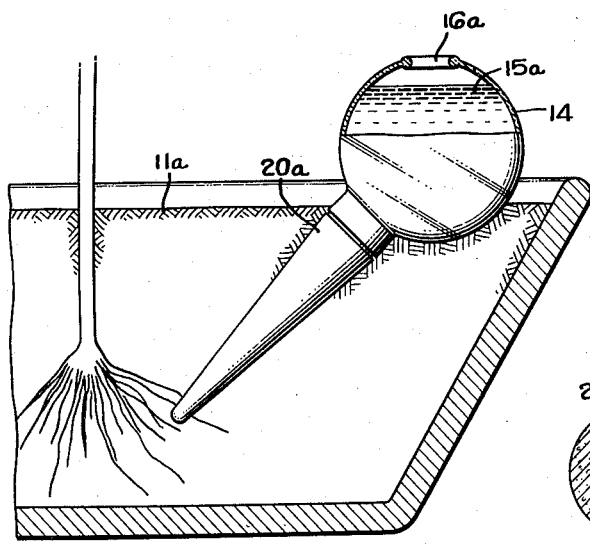
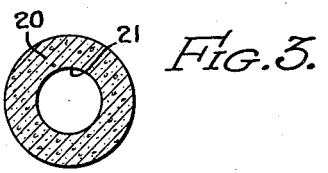
INVENTOR,
VICTOR H. CHATTEN
BY Lyon & Lyon
ATTORNEYS United States Patent Office 2,837,869
Patented June 10, 1958

2,837,869
PLANT-WATERING DEVICE
Victor H. Chatten, Torrance, Calif., assignor of one-half to Takeo Ono, Gardena, Calif.
Application November 12, 1954, Serial No. 468,269
1 Claim. (Cl. 47—48.5)

This invention relates to soil moistening apparatus and is particularly directed to improvements in devices for watering small plants.

Among the objects of this invention are to provide a compact device of attractive appearance which can be used for moistening the soil in a small planter box or the like and which will supply the necessary amount of water without danger of flooding, or starving.

Another object is to provide such a device which may readily be installed or removed from the soil in the planter box, or flower pot.

Another object is to provide such a device having a porous ceramic member for metering water at the desired flow rate in to the soil.

Another object is to provide such a device having a transparent water reservoir so that the amount of water therein may readily be observed.

A further object is to provide a watering device having a bulb attached to a hollow ceramic stem. The stem being tapered toward a point for ready insertion into the soil and having its largest diameter adjacent the point of attachment to the water reservoir, thereby providing a connecting joint of maximum strength and rigidity.

Another object is to provide a plant-watering device of this type which is proportioned so that duplicate devices may be stacked in telescoping relationship.

Other and more detailed objects and advantages will appear hereinafter.

In the drawings:

Figure 1 is a perspective view showing a planter box, with a preferred embodiment of my invention shown in operative position.

Figure 2 is a longitudinal sectional view showing construction of the preferred form of plant-watering device illustrating the manner of stacking duplicate devices through telescopic movement.

Figure 3 is a transverse sectional view taken substantially on the lines 3—3 as shown in Figure 2.

Figure 4 is a sectional elevation showing a modified form of plant-watering device.

Referring to the drawings:

The planter box 10 may be of any suitable or desirable size and shape and contains soil 11 in which a plant 12 grows. A plant-watering device generally designated 13 serves to feed water to the soil to maintain it in a moist condition by metering water into the soil at a very low flow rate, not dependent on soil tension. Many planter soil mixes are loose rather than compacted and hence it is not feasible to depend on soil tension for rate of flow.

The preferred form of plant-water device as shown in Figure 2 includes a bulb 14 which is preferably formed of transparent plastic material or glass. If desired the bulb may be made of spherical shape to provide the maximum volume for the water reservoir 15 therein. The bulb 14 has a filling opening 16 through which water is introduced into the reservoir 15. The bulb is provided with an integral skirt 17 which encompasses the outlet opening 18. This skirt receives the upper end 19 of the hollow stem 20. The stem 20 is formed of porous ceramic material and has an axially extending cavity 21 which communicates with the reservoir 15 but which stops short of the lower end 22 of the stem 20. Any suitable or desirable adhesive 23 may be employed for cementing the ceramic stem 20 to the bulb 14. I have found that the cement known as du Pont 5457 gives very satisfactory results. Furthermore, I have found that a porosity of 20% by absorption is satisfactory for the ceramic material. It is desirable to have the device deliver approximately one tablespoon of water in a twenty-four hour period under a pressure head of two inches. While various forms of ceramic material may be employed, I have found to be satisfactory a composition of 40% ball clay, 10% feldspar, and 50% talc.

A feature of my invention resides in the fact that the outer surface of the ceramic stem 20 tapers from the small pointed end 22 to the larger dimension adjacent the skirt 17. This construction provides for maximum strength and rigidity at the joint between the glass bulb and the ceramic stem and at the same time facilitates installation and removal of the stem from the soil 11.

Another feature of my invention lies in the proportion of the parts whereby stacking by telescopic movement is provided. Thus, as shown in Figure 2, duplicate devices may be stacked by inserting the stem of one through the bulb of another. This is a very desirable feature since stacking of two devices both filled with water prolongs the period during which the watering action occurs. If one device is large enough to keep the planter soil moist for a week then two stacked devices both filled with water will maintain the soil in proper moist condition for two weeks, with each additional unit providing another week of watering. The rate of flow remains substantially constant regardless of the number of stacked units.

In the modified form of my invention shown in Figure 4, the entrance opening 16a in the bulb 14 is placed to one side of the axis of the stem 20a. In this way the stem may be inserted into the soil 11a in an inclined direction without sacrificing the maximum quantity of water which may be placed in the reservoir 15a. In other respects the form of the invention shown in Figure 4 is the same as that previously described.

Having fully described my invention, it is to be understood that I do not wish to be limited to the details herein set forth, but my invention is of the full scope of the appended claim.

I claim:

A plant-watering device having a bulb shaped to provide a water reservoir, the bulb having a filler opening and a skirt defining an outlet opening, the openings being axially aligned, and the filler opening being smaller than the maximum lateral dimension of the bulb but larger than the outlet opening, a hollow stem formed of porous ceramic material and having an outer surface tapering from a small lower end to a larger upper end, said upper end having a portion cooperating with said skirt and fixed thereto, said stem having a central axially extending cavity opening directly into the reservoir in the bulb, the outside lateral dimensions of the lower portion of the stem being smaller than the inside lateral dimensions of the upper portion of the stem cavity, the stem being longer than the distance between the bulb openings, the proportions of the bulb and stem being such that a duplicate device may be stacked thereon in telescoping relationship therein with the stem on the upper device projecting through both bulb openings and into the stem cavity on the lower device, the filler opening on the bulb of the lower device cooperating with the skirt on the said duplicate device to limit lateral movement thereof.

References Cited in the file of this patent

UNITED STATES PATENTS

| 689,248 | Timm | Dec. 17, 1901 |
| 1,424,157 | Cook | Aug. 1, 1922 |

FOREIGN PATENTS

| 577,276 | France | June 2, 1924 |
| 122,349 | Germany | July 26, 1901 |
| 202,146 | Germany | Sept. 26, 1908 |